United States Patent [19]
Sato

[11] Patent Number: 5,864,451
[45] Date of Patent: Jan. 26, 1999

[54] MAGNETIC TAPE HEAD HAVING LONGITUDINAL TRACK WIDTH RESTRICTION GROOVES

[75] Inventor: Masashi Sato, Yamagata, Japan

[73] Assignee: Mitsumi Electric Co., Ltd., Tokyo, Japan

[21] Appl. No.: 902,064

[22] Filed: Jul. 29, 1997

[30] Foreign Application Priority Data

Jul. 31, 1996 [JP] Japan .................................. 8-217860

[51] Int. Cl.⁶ .................................................. G11B 5/187
[52] U.S. Cl. .......................... 360/119; 360/122; 360/125
[58] Field of Search ..................................... 360/103, 119, 360/120, 122, 125, 126

[56] References Cited

U.S. PATENT DOCUMENTS

| 5,138,508 | 8/1992 | Matsuzawa et al. | 360/121 |
| 5,402,295 | 3/1995 | Suzuki et al. | 360/122 |
| 5,475,553 | 12/1995 | Saliba | 360/122 |
| 5,602,703 | 2/1997 | Moore et al. | 360/121 |
| 5,610,786 | 3/1997 | Tokutake et al. | 360/122 |

*Primary Examiner*—Jefferson Evans
*Attorney, Agent, or Firm*—Whitham, Curtis & Whitham

[57] ABSTRACT

In a magnetic head 20 includes a pair of cores 21 and 22 bonded with each other, a gap portion 26 defined between bonding surfaces of the pair of cores, track width restriction grooves 21b and 22b provided respectively in the cores so that the gap portion has a width TW equal to a predetermined track width, and bonding glass 25 sealed in the track width restriction grooves, a plurality of grooves 27 and 28 are formed in parallel to each other and the cores are partly remained on the opposite ends of the plurality of grooves.

7 Claims, 10 Drawing Sheets

5,864,451

MAGNETIC TAPE HEAD HAVING LONGITUDINAL TRACK WIDTH RESTRICTION GROOVES

BACKGROUND OF THE INVENTION

1. Field of the Invention

The present invention relates to a magnetic head for use in a magnetic recording/reproducing apparatus such as a video tape recorder (VTR), a digital video cassette (DVC), a digital audio tape recorder (DAT), etc.

2. Related Art

Conventionally, a magnetic head for use in a VTR is configured, for example, in such a manner as shown in FIG. 10.

That is, in FIG. 10, a magnetic head 1 is a so-called ferrite bulk magnetic head in which a pair of ferrite cores, that is, a C-shaped core 2 and an I-shaped core 3, are made to face each other and bonded with each other by bonding glass 4 so as to form a predetermined gap portion 5 and coils (not shown) are respectively wound in winding grooves 2a and 3a which are provided respectively in the cores 2 and 3.

Here, as shown in FIG. 11, with respect to the gap portion 5, track width restriction grooves 2b and 3b are formed in the opposite side surfaces of the respective cores 2 and 3 in order to obtain a desired track width, and then when the cores 2 and 3 are bonded with each other, the bonding glass 4 is filled in the track width restriction grooves 2b and 3b at the same time.

Thus, a tape slide surface A is defined by the upper surfaces of the cores 2 and 3 and the upper surface of the bonding glass 4 in a manner so that the region of the gap portion 5 formed between the track width restriction grooves 2b and 3b are disposed on the way of the slide surface A.

Further, such a so-called metal-in-gap (MIG) magnetic head as shown in FIGS. 12 and 13 is also known.

In FIG. 12, a MIG magnetic head 6 is formed in such a process that after metallic magnetic films 7a and 8a are deposited on bonding surfaces of a pair of cores 7 and 8 made from Mn—Zn ferrite, the bonding surfaces are made to face each other so as to be bonded with bonding glass 4 to thereby form a gap portion 9 of a predetermined gap width, and coils (not shown) are wound in winding grooves 7b and 8b formed in the respective cores 7 and 8.

Here, as shown in FIG. 13, with respect to the gap portion 9, track width restriction grooves 7c and 8c are formed in the opposite side surfaces of the respective cores 7 and 8 in order to obtain a desired track width, and then when the cores 7 and 8 are bonded with each other, the bonding glass 4 is filled in the track width restriction grooves 7c and 8c at the same time.

Thus, a tape slide surface A is defined by the upper surfaces of the cores 7 and 8 and the upper surface of the bonding glass 4 in a manner so that the region of the gap portion 9 formed between the track width restriction grooves 7c and 8c are disposed on the way of the slide surface A.

In each of the thus configured magnetic heads 1 and 6, however, there is such a problem as follows.

In the magnetic head 1 (6), since the cores 2 and 3 (7 and 8) are bonded with each other after formation of the track width restriction grooves 2b and 3b (7c and 8c), there is a possibility that the track width restriction grooves 2b and 3b (7c and 8c) of the cores 2 and 3 (7 and 8) are displaced from each other as shown in FIG. 11 (FIG. 13), so that at the time of recording/reproducing by means of the magnetic head 1 (6), noise may be generated by magnetic flux leakage from such track displacement portions d so as to make it impossible to perform accurate signal recording/reproducing. Particularly in the case of a magnetic head for DVC or the like having a narrow track width, there is a fear that it becomes impossible to perform recording/reproducing per se by the track displacement portions d.

In this regard, for example, a magnetic head having such a configuration as shown in FIG. 14 is known.

In FIG. 14, a magnetic head 10 is formed in such a process that after the cores 2 and 3 are bonded in the magnetic head 1 of FIG. 10, the regions of the track width restriction grooves 2b and 3b are removed along the longitudinal direction of the tape slide surface A so that the track width restriction grooves 2b and 3b pass the opposite sides of the gap portion 5 to thereby prevent occurrence of track displacement of the gap portion 5, bonding glass 11 is filled in the removed regions, and the opposite sides of the bonding glass 11 are removed to thereby form steps 12.

In such a magnetic head 10, while it is possible to suppress the occurrence of track displacement, there arises a problem in practical use that the bonding glass 11 is worn away early in use because the bonding glass 11 having low abrasion resistance is exposed widely with respect to the tape slide surface A.

SUMMARY OF THE INVENTION

In view of the above points, an object of the present invention is to provide a magnetic head in which the abrasion resistance is improved and the track displacement can be avoided.

The above object can be achieved, according to the present invention, by a magnetic head comprising a pair of cores bonded with each other, a gap portion defined between bonding surfaces of the pair of cores, track width restriction grooves provided respectively in the cores so that the gap portion has a width equal to a predetermined track width, and bonding glass sealed in the track width restriction grooves, which is characterized in that the track width restriction grooves formed after the pair of cores are bonded with each other include a plurality of grooves formed in parallel to each other so as to restrict the width of the gap portion to the predetermined track width, and the cores are partly remained on the opposite ends of the plurality of grooves.

In the magnetic head according to the present invention, preferably, the track width restriction grooves extend, on a magnetic medium sliding surface, in the longitudinal direction of the cores.

In the magnetic head according to the present invention, preferably, the track width restriction grooves extend, on a magnetic medium sliding surface, obliquely to the longitudinal direction of the cores and perpendicularly to the gap portion.

In a magnetic head according to the present invention, preferably, the track width restriction grooves have a width in a range of from 5 to 30 μm.

By the above configuration, since the track width restriction grooves are formed on the opposite sides of the gap portion after the cores are bonded with each other, the gap portion is formed in an exactly matched state without generation of any displacement in the gap portion defined by the track width restriction grooves. Accordingly, no magnetic flux leakage due to gap displacement is generated and noise due to magnetic flux leakage can be reduced.

Further, since the magnetic medium slide surface is constituted by the upper surfaces of the pair of cores, and the surfaces of the bonding glass filled in the track width restriction grooves similar to the conventional ones and in the track width restriction grooves having relatively narrow widths, the exposed area of the bonding glass is relatively small so that good abrasion resistance can be obtained without lowering the abrasion resistance.

DETAILED DESCRIPTION OF THE DRAWINGS

Figure 1:
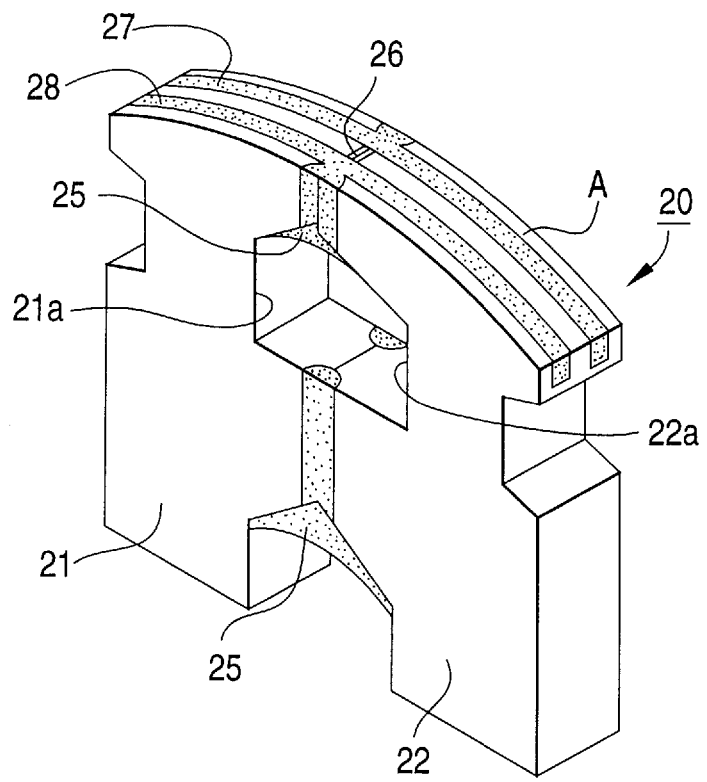
FIG. 1 is a schematic perspective view showing a first embodiment of the magnetic head according to the present invention.

The present invention will be described in detail below with reference to embodiments illustrated in the drawings.

Figure 2:
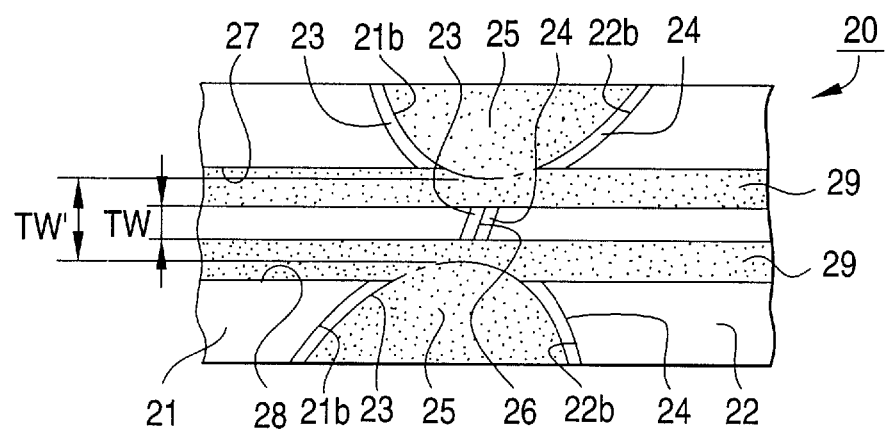
FIG. 2 is a partly enlarged plan view showing a main part of the magnetic head of FIG. 1.

FIGS. 1 and 2 illustrate a first embodiment of the magnetic head according to the present invention.

In FIGS. 1 and 2, the magnetic head 20 is an MIG magnetic head for a VTR which is formed in such a process that after metallic magnetic films 23 and 24 of an Fe—Al—Si alloy or the like are deposited on the respective bonding surfaces of a pair of cores 21 and 22 made from Mn—Zn ferrite or the like, the bonding surfaces are bonded with each other by bonding glass 25 and coils (not shown) are wound in winding grooves 21a and 22a of the cores 21 and 22.

Here, a gap member (not shown) is interposed between the bonding surfaces of the cores 21 and 22 so as to form a gap portion 26.

Figure 12:
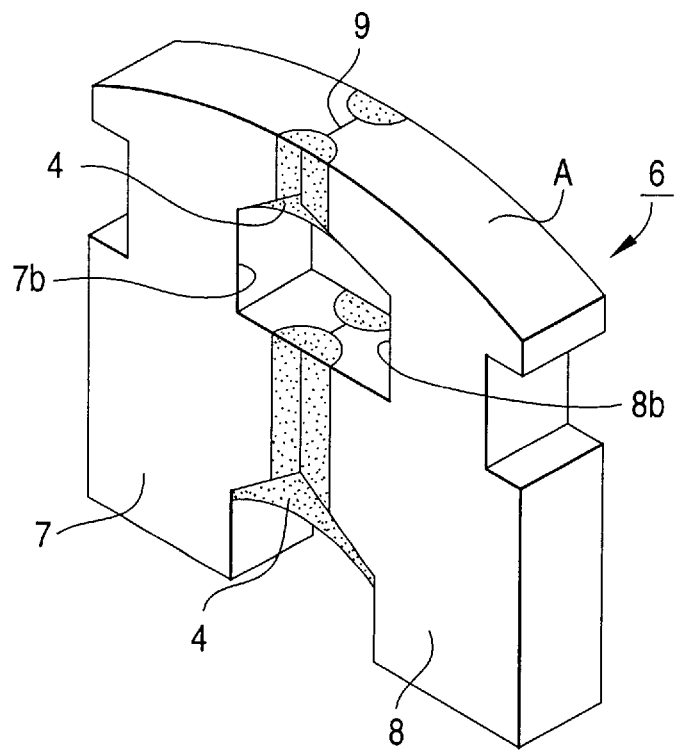
FIG. 12 is a schematic perspective view showing an example of the conventional MIG magnetic head.
Figure 13:
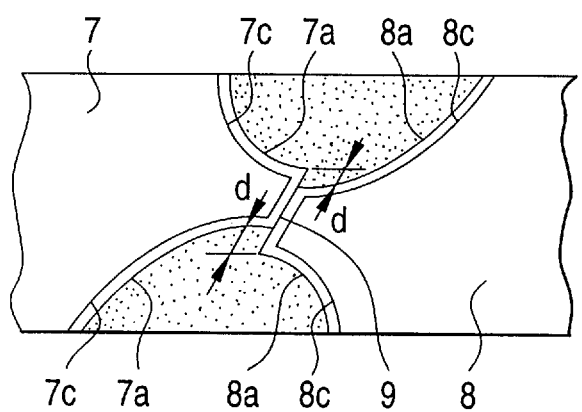
FIG. 13 is a partly enlarged plan view showing a main part of the magnetic head of FIG. 12.
Figure 14:
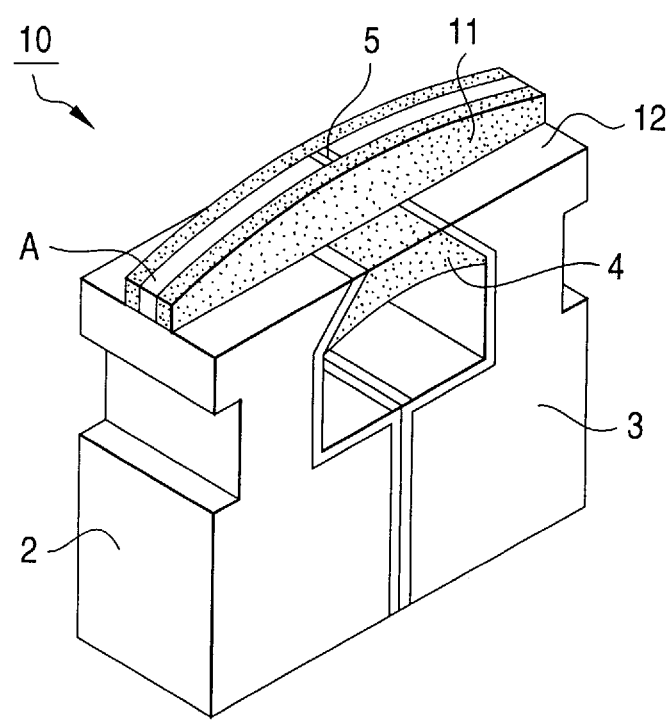
FIG. 14 is a schematic perspective view showing another example of the conventional ferrite bulk magnetic head.

The gap portion 26 is defined by track width restriction grooves 21b and 22b provided in the respective cores 21 and 22, similarly to the conventional magnetic head 6 shown in FIG. 12, so as to have a gap width TW' a little larger than a desired gap width TW, and then the gap portion 26 is further defined so as to have the gap width TW exactly by second track width restriction grooves 27 and 28 which are formed so as to extend parallelly to each other along the longitudinal direction of the cores 21 and 22.

Here, bonding glass 25 is filled in the track width restriction grooves 21b and 22b when the cores 21 and 22 are bonded with each other, while bonding glass 29 is filled in the second track width restriction grooves 27 and 28 after formation of the latter.

Further, the width of each of the second track width restriction grooves 27 and 28 is selected to be, for example, about in a range of from 5 to 30 μm, and finished, for example, by abrasives.

Thus, a tape slide surface A is defined by the upper surfaces of the cores 21 and 22 and the upper surfaces of the bonding glass 25 and 29 in a manner so that the region of the gap portion 26 formed between the track width restriction grooves 27 and 28 are disposed on the way of the slide surface A.

Figure 3:
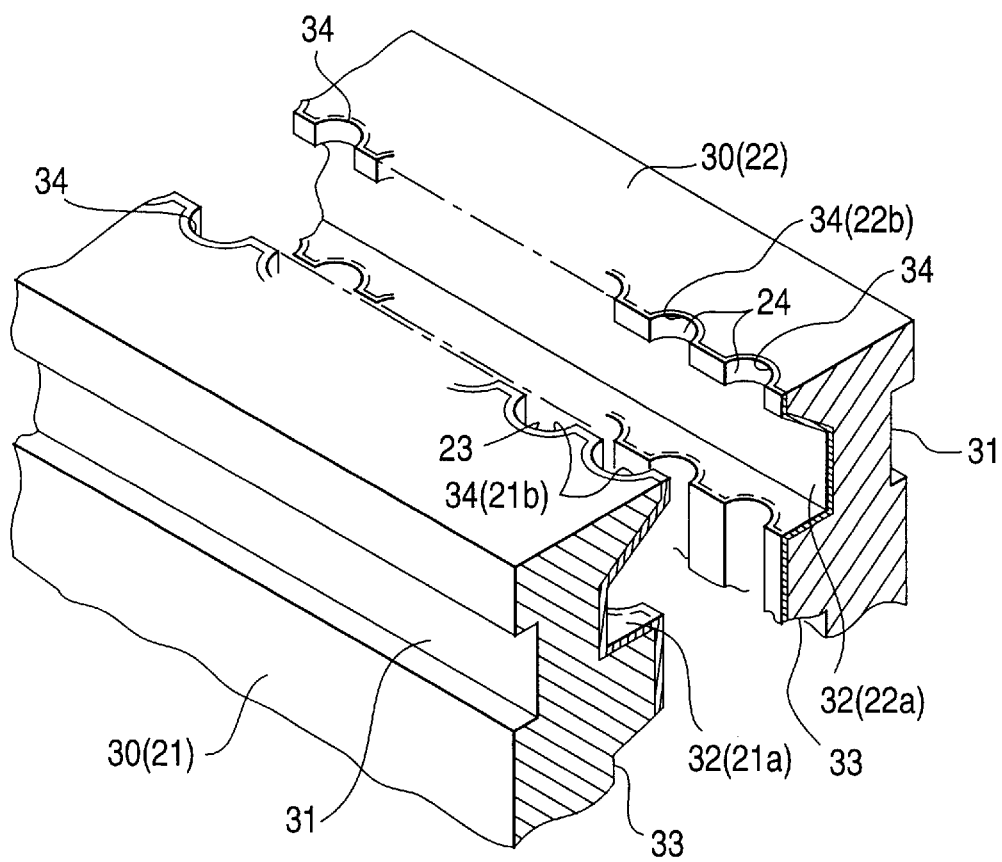
FIG. 3 is a schematic perspective view showing a first stage of the process of producing the magnetic head of FIG. 1.
Figure 4:
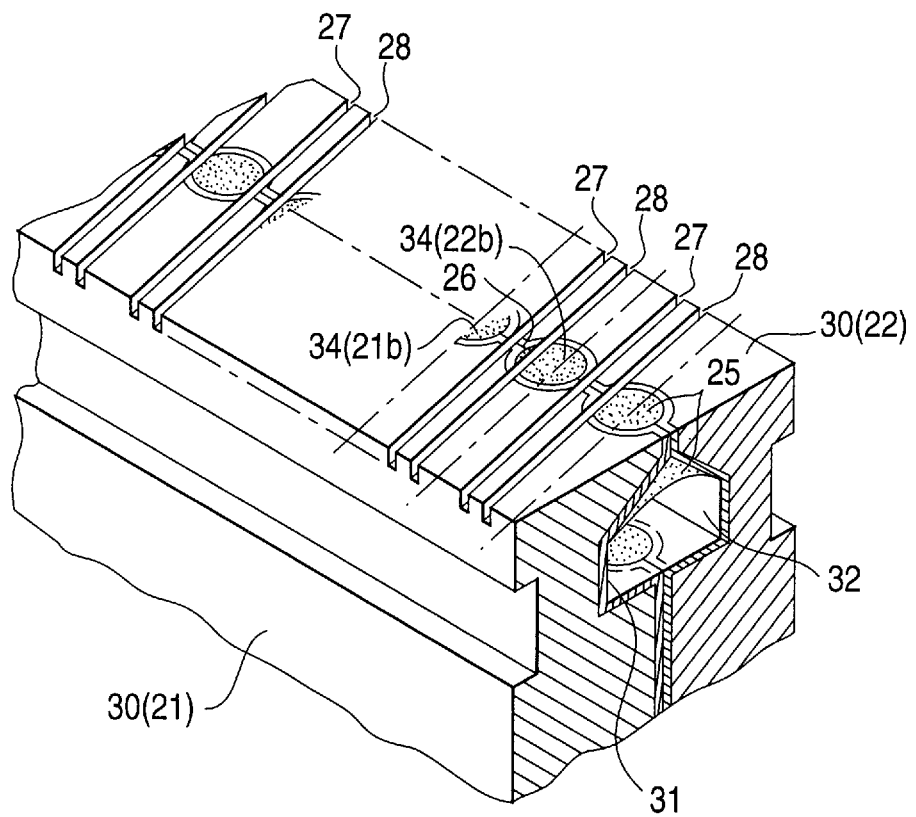
FIG. 4 is a schematic perspective view showing a second stage of the process of producing the magnetic head of FIG. 1.

Here, the magnetic head 20 is produced in such a manner as shown in FIGS. 3 and 4.

That is, in FIG. 3, first, in core materials 30 for constituting the cores 21 and 22, winding guides 31, winding grooves 32 (21a) and reinforcing grooves 33 are formed in the longitudinal direction, and then a plurality of track width restriction grooves 34 (21b, 22b) are formed in bonding surfaces of the core materials so as to extend in the vertical direction and so as to adjacent to each other in the longitudinal direction.

Then, as shown in FIG. 3, metallic magnetic films 23 and 24 are deposited on the bonding surfaces of the pair of core materials 30 (cores 21 and 22).

In this state, the core materials 30 (cores 21 and 22) are bonded with each other by the bonding glass 25 as shown in FIG. 4. At this time, the bonding glass 25 is filled in the track width restriction grooves 34.

Further, as shown in FIG. 4, second track width restriction grooves 27 and 28 are formed in the upper surfaces of the core materials 30 bonded with each other and on the opposite sides of each gap portion 26 formed between the track width restriction grooves 34 so that the second track width restriction grooves 27 and 28 extend obliquely relative to the gap portion 26 so as to define accurate track width TW of the gap portion 26.

These second track width restriction grooves 27 and 28 are formed comparatively shallowly in the upper surfaces of the core materials 30 and the width of each of the second track width restriction grooves is worked so as to be relatively shallow to about 5 to 30 μm, for example, by using abrasives having a blade width not thicker than 30 μm.

Then, the bonding glass 29 is filled in the second track width restriction grooves 27 and 28.

Finally, as shown by chain lines in FIG. 4, the core materials 30 (cores 21 and 22) are sliced so as to be predetermined core chip thicknesses along each line extending parallelly to the second track width restriction grooves 27 and 28 and passing a vicinity of the center of each track width restriction groove 34. Thus, the magnetic head 20 shown in FIG. 1 is completed.

The magnetic head 20 of this embodiment of the present invention has such a configuration as mentioned above so that the gap portion 26 defined by the bonding surfaces of the cores 21 and 22 is formed so as to have a track width TW' a little larger than a predetermined track width TW by the track width restriction grooves 21b and 22b, and then further defined so as to be the predetermined track width TW exactly by the second track width restriction grooves 27 and 28.

In such a configuration, when magnetic tape (not shown) slides on the tape slide surface formed by the upper surfaces of the cores 21 and 22 and the upper surfaces of the bonding glass 25 and bonding glass 29 of the magnetic head 20, data or the like magnetically recorded on the magnetic tape are converted, by the coils (not shown), into electrical signals to be reproduced, or electrical signals externally applied to the coils are magnetically recorded on the magnetic tape.

In this case, with respect to the gap portion 26, since the second track width restriction grooves 27 and 28 are formed after the cores 21 and 22 are bonded with each other, no gap displacement is caused. Accordingly, since no magnetic flux leakage is caused by the gap displacement, generation of noise due to magnetic flux leakage can be reduced so that accurate recording/reproducing can be carried out even with a magnetic head having a narrow track width such as DVC etc.

Further, since the second track width restriction grooves 27 and 28 are formed to be relatively narrow in the tape slide surface, the bonding glass 29 is required so as to have only a very small exposed area. Accordingly, lowering of the abrasion resistance of the magnetic head 20 due to the existence of the bonding glass 29 can be prevented, so that good abrasion resistance can be obtained and stable recording/reproducing characteristics can be obtained.

Further, although an Fe—Al—Si alloy is used as the material for the metallic magnetic films 23 and 24 in the magnetic head 20 of the embodiment of the present invention, any other metallic magnetic films may be suitably selected in use.

Figure 5:
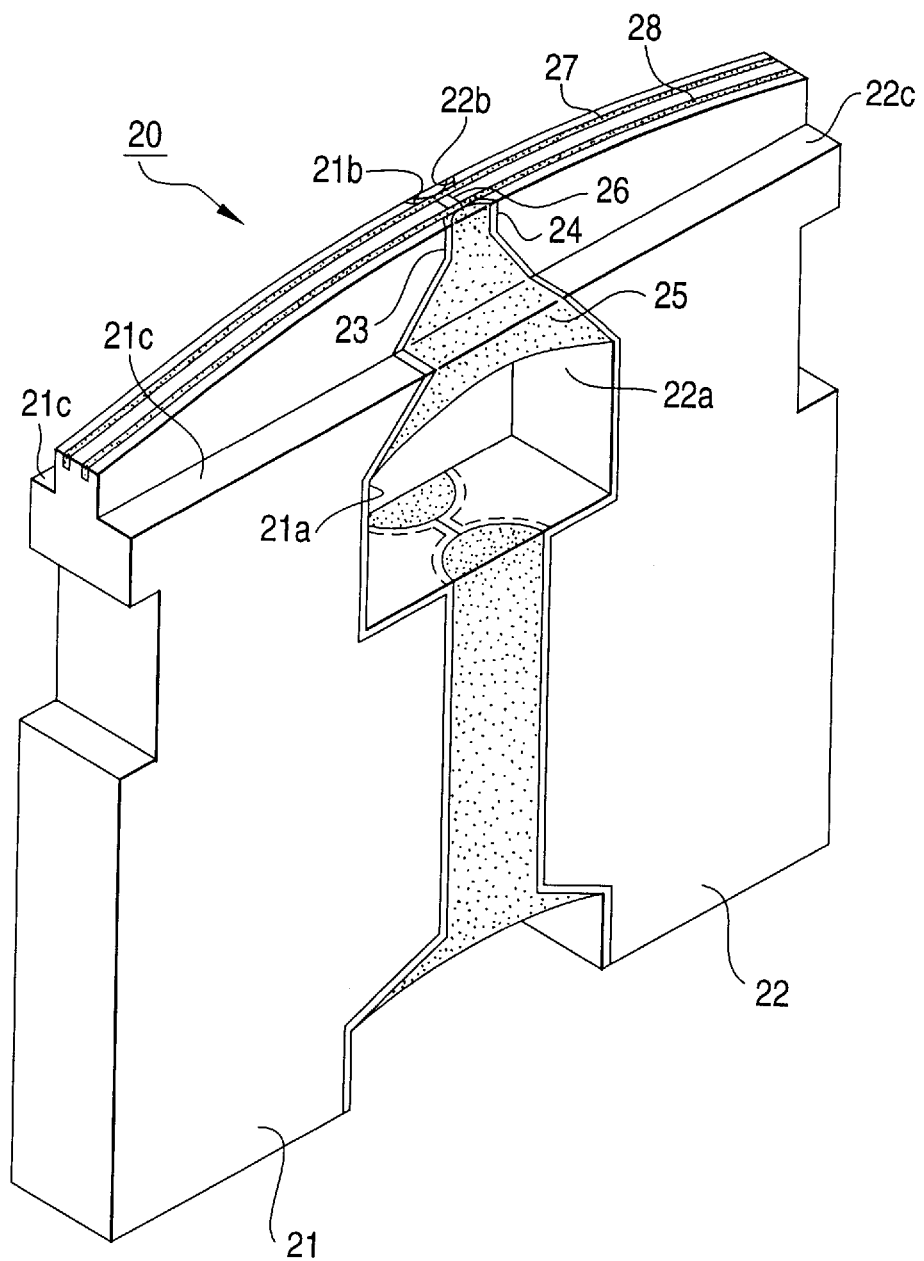
FIG. 5 is a schematic perspective view showing a modification of the magnetic head of FIG. 1.

FIG. 5 shows a modification of the above-mentioned magnetic head 20.

In FIG. 5, the magnetic head 20 of this modification is different from the magnetic head shown in FIGS. 1 and 2 only in the point that step portions 21c and 22c are formed on the opposite sides of the magnetic head by stepping work to form a tape slide surface having a width wider than the track width of the gap portion 26 in order that the upper surfaces of the cores 21 and 22 of the magnetic head 20 keep the tightness with the magnetic tape and the mechanical strength of the gap portion 26, while the magnetic head of FIG. 5 is the same in operation as the magnetic head shown in FIGS. 1 and 2.

Figure 6:
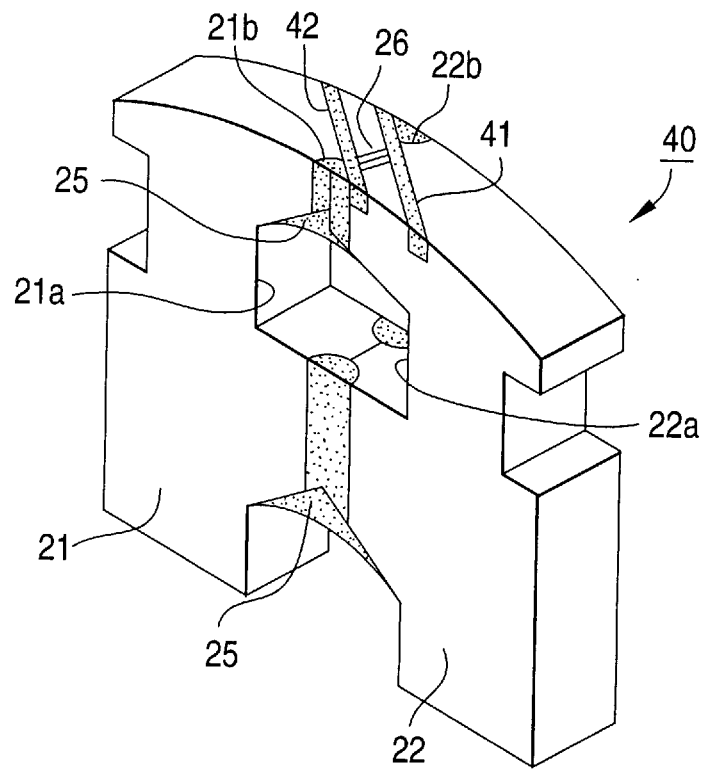
FIG. 6 is a schematic perspective view showing a second embodiment of the magnetic head according to the present invention.

FIG. 6 shows a second embodiment of the magnetic head according to the present invention.

In FIG. 6, a magnetic head 40 is substantially the same in configuration as the magnetic head 20 shown in FIGS. 1 and 2 excepting that second track width restriction grooves 41 and 42 are extended perpendicularly to the gap portion 26 and hence obliquely to the longitudinal direction of the tape slide surface by an angle θ (see FIG. 7), and are filled with bonding glass 43.

In the magnetic head 40 having such a configuration, similarly to the case of the magnetic head 20 shown in FIGS. 1 and 2, the gap portion 26 is defined so as to have a width exactly equal to a predetermined track width TW by the second track width restriction grooves 41 and 42 formed after the cores 21 and 22 are bonded.

In such a configuration, when magnetic tape (not shown) slides on the tape slide surface formed by the upper surfaces of the cores 21 and 22 and the upper surfaces of the bonding glass 25 and bonding glass 43 of the magnetic head 40, data or the like magnetically recorded on the magnetic tape are converted, by the coils (not shown), into electrical signals to be reproduced, or electrical signals externally applied to the coils are magnetically recorded on the magnetic tape.

In this case, with respect to the gap portion 26, since the second track width restriction grooves 41 and 42 are formed after the cores 21 and 22 are bonded with each other, no gap displacement is caused. Accordingly, since no magnetic flux leakage is caused by the gap displacement, generation of noise due to magnetic flux leakage can be reduced so that accurate recording/reproducing can be carried out even with a magnetic head having a narrow track width such as DVC etc.

Further, since the second track width restriction grooves 41 and 42 are formed relatively shorter than the second track width restriction groove 27 and 28 of the magnetic head 20, the bonding glass 43 is required so as to have a further reduced exposed area. Accordingly, lowering of the abrasion resistance of the magnetic head 40 due to the existence of the bonding glass 43 can be further reduced, so that good abrasion resistance can be obtained and stable recording/reproducing characteristics can be obtained. Further, the quantity of bonding glass 43 to be filled in the second track width restriction grooves 41 and 42 need not large so that the cost can be reduced.

Figure 8:
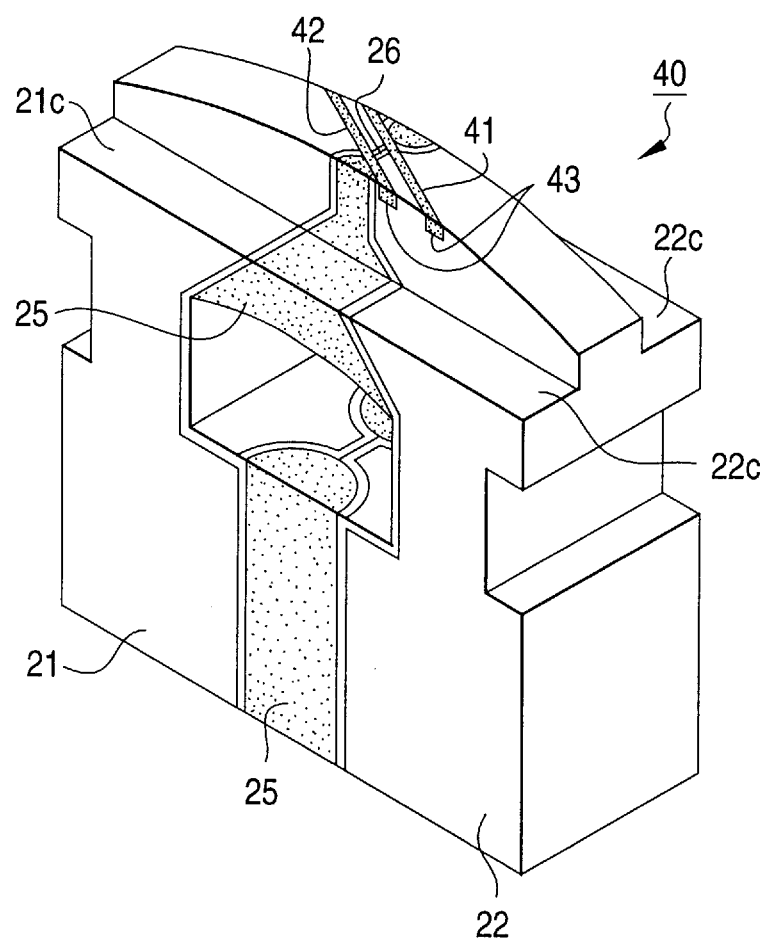
FIG. 8 is a schematic perspective view showing a modification of the magnetic head of FIG. 6.
Figure 9:
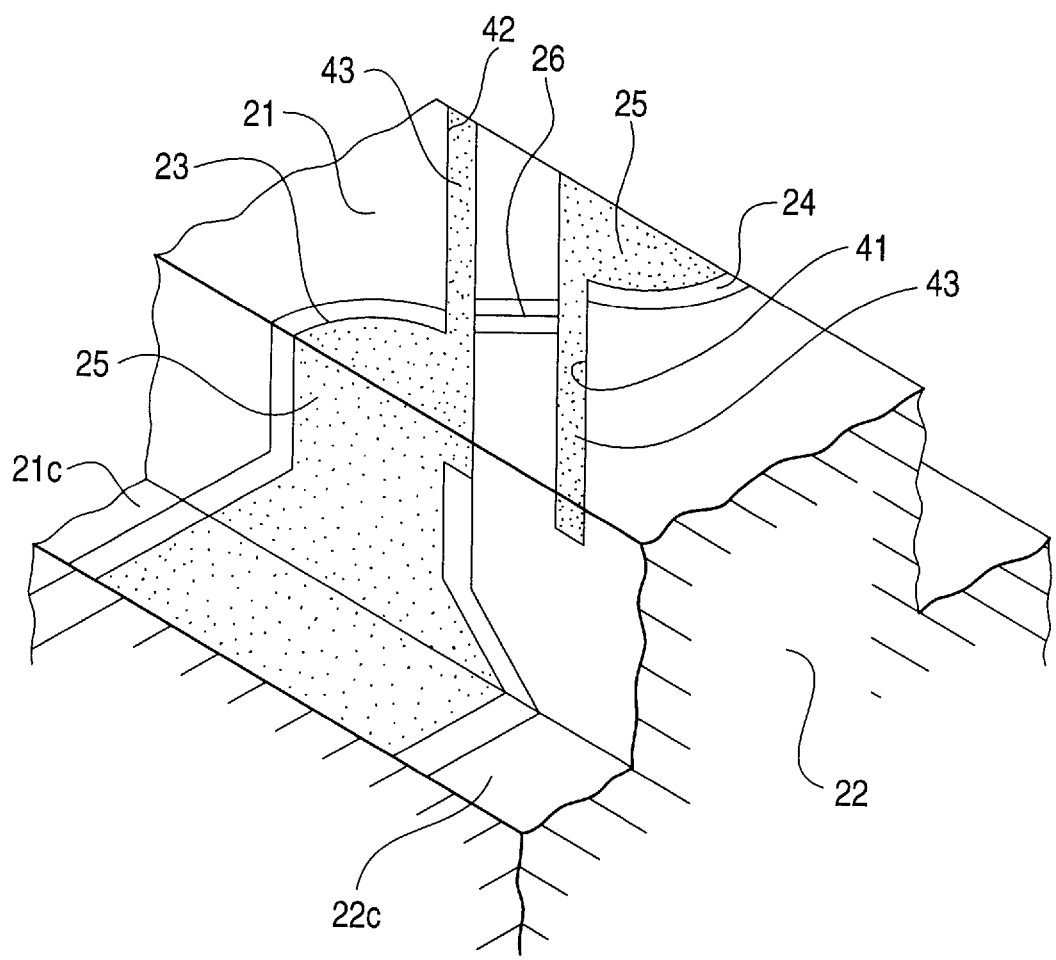
FIG. 9 is a partly enlarged perspective view showing a main part of the magnetic head of FIG. 8.
Figure 10:
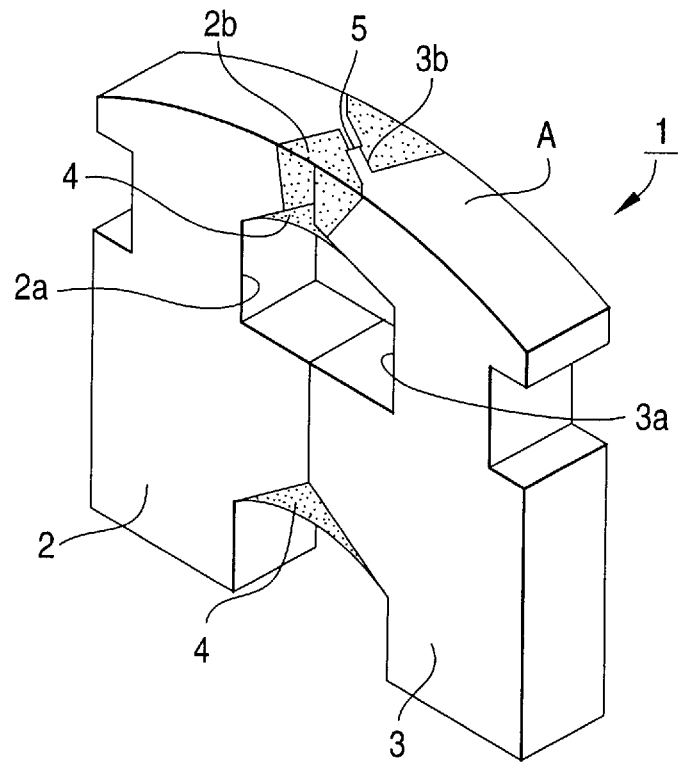
FIG. 10 is a schematic perspective view showing an example of the conventional ferrite bulk magnetic head.
Figure 11:
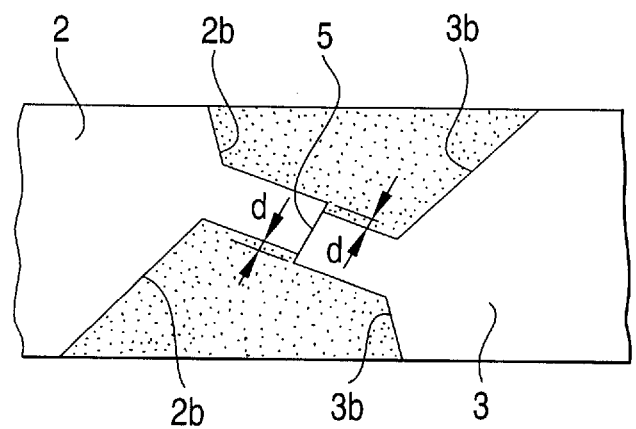
FIG. 11 is a partly enlarged plan view showing a main part of the magnetic head of FIG. 10.

FIGS. 8 and 9 show a modification of the above-mentioned magnetic head 40.

Figure 7:
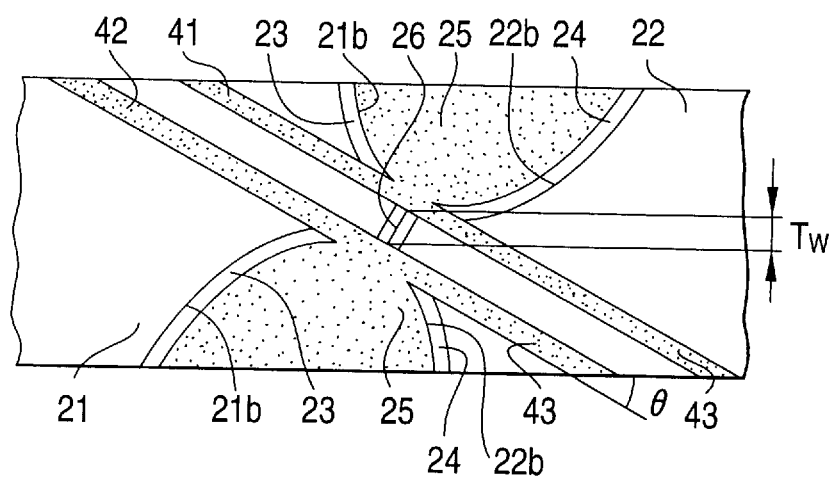
FIG. 7 is a partly enlarged plan view showing a main part of the magnetic head of FIG. 6.

In FIGS. 8 and 9, the magnetic head 40 is different from the magnetic head shown in FIGS. 6 and 7 only in the point that step portions 21c and 22c are formed on the opposite sides of the magnetic head 40 by stepping work to form a tape slide surface having a width wider than the track width of the gap portion 26 in order that the upper surfaces of the cores 21 and 22 of the magnetic head 40 keep the tightness with the magnetic tape and the mechanical strength of the gap portion 26, while the magnetic head 40 is the same in operation as the magnetic head shown in FIGS. 6 and 7.

Further, although a case of the magnetic heads for VTR was described in the above embodiments, the present invention is not limited to such a case but it is apparent that the present invention is applicable to magnetic heads for various magnetic media including digital audio tape, various tape for audio.

As described above, according to the present invention, track width restriction grooves are formed on the opposite sides of the gap portion after the cores are bonded with each other, so that the gap portion is formed in an exactly matched state without generation of any displacement in the gap portion. Accordingly, no magnetic flux leakage due to gap displacement is generated and noise due to magnetic flux leakage can be reduced.

Further, since the magnetic medium slide surface is constituted by the upper surfaces of the pair of cores, and the surfaces of the bonding glass filled in the track width restriction grooves similar to the conventional ones and in the second track width restriction grooves having relatively narrow widths, the exposed area of the bonding glass is relatively small so that good abrasion resistance can be obtained without lowering the abrasion resistance.

Thus, according to the present invention, it is possible to provide an extremely superior magnetic head in which the abrasion resistance can be improved and track displacement can be avoided.

What is claimed is:

1. A magnetic head comprising:
   a pair of cores bonded with each other;
   a gap portion defined between bonding surfaces of said cores;
   track width restriction grooves provided respectively in said cores in a substantially longitudinal direction so that said gap portion has a width equal to a predetermined track width, the track width restriction grooves, formed after said pair of cores are bonded with each other, including a plurality of grooves formed in parallel to each other so as to restrict the width of said gap portion to said predetermined track width, and said cores having portions remaining on lateral sides of the track width restriction grooves opposite said gap portion; and
   bonding glass sealed is said plurality of track width restriction grooves.

2. A magnetic head according to claim 1, wherein said track width restriction grooves extend, on a magnetic medium sliding surface, in the longitudinal direction of said cores.

3. A magnetic head according to claim 1, wherein said track width restriction grooves extend, on a magnetic medium sliding surface, obliquely to the longitudinal direction of said cores and perpendicularly to said gap portion.

4. A magnetic head according to claim 1, wherein said track width restriction grooves have a width in a range of from 5 to 30 $\mu$m.

5. A magnetic head according to claim 1, wherein the magnetic film is a Fe—Al—Si alloy.

6. A magnetic head according to claim 1, wherein said track width restriction grooves comprise first track width restriction grooves and second track width restriction grooves.

7. A magnetic head according to claim 1, wherein a magnetic film is formed on each of said bonding surfaces.

* * * * *